United States Patent [19]

Harrison et al.

[11] Patent Number: 4,927,212
[45] Date of Patent: May 22, 1990

[54] ROTARY ELECTRIC DRIVE DEVICE FOR ANTI-SKID BRAKING SYSTEM

[75] Inventors: Anthony W. Harrison, Birmingham; Philip A. Taft, Solihull, both of England

[73] Assignee: Lucas Industries, Public Limited Company, Birmingham, England

[21] Appl. No.: 273,072

[22] Filed: Nov. 18, 1988

[30] Foreign Application Priority Data

Nov. 20, 1987 [GB] United Kingdom ................ 8727294
Nov. 20, 1987 [GB] United Kingdom ................ 8727293

[51] Int. Cl.$^5$ ............................................. B60T 8/32
[52] U.S. Cl. ................................... 303/115; 303/113; 310/78; 188/82.7; 188/158
[58] Field of Search ........ 303/115, 113, 116; 188/158–165, 82.1, 82.7, 82.77, 171, 173; 310/77, 78, 83

[56] References Cited

U.S. PATENT DOCUMENTS

| | | | |
|---|---|---|---|
| 3,165,656 | 1/1965 | Korthaus et al. ................ | 310/78 X |
| 3,235,045 | 2/1966 | Pop ................................ | 188/162 X |
| 3,420,580 | 1/1969 | Dymond ........................... | 303/116 |
| 3,549,210 | 12/1970 | Birge et al. ..................... | 303/115 |
| 3,659,683 | 5/1972 | Betzing ........................... | 188/162 |
| 4,116,308 | 9/1978 | Sever .............................. | 188/171 |
| 4,280,073 | 7/1981 | Miller .............................. | 310/77 |
| 4,344,056 | 8/1982 | Kroeger et al. ................. | 310/77 X |
| 4,427,909 | 1/1984 | Takahashi ....................... | 310/78 X |
| 4,476,965 | 10/1984 | Brown, Jr. et al. ............. | 188/171 |
| 4,497,395 | 2/1985 | Nogami et al. ................. | 188/161 X |
| 4,510,405 | 4/1985 | Carroll et al. .................. | 310/78 X |

Primary Examiner—Douglas C. Butler
Attorney, Agent, or Firm—Staas & Halsey

[57] ABSTRACT

A rotary electric drive device for use in a vehicle anti-skid braking system has a rotary armature supported by a thrust race in relation to a housing. One part of the thrust race has external teeth for co-action with a pawl which is disengaged from the teeth for one direction of rotation of the armature but engages the teeth during rotation in the other direction to lock the race part to the housing. When this happens, slipping occurs between opposed contiguous faces of the armature and part respectively in order to dissipate some of the rotational energy of the armature when the drive device is de-energized.

24 Claims, 2 Drawing Sheets

ROTARY ELECTRIC DRIVE DEVICE FOR ANTI-SKID BRAKING SYSTEM

This invention relates to a rotary electric drive device having a rotary armature supported for rotation relative to a fixed structure, the drive device being primarily for use in a vehicle anti-skid hydraulic braking system to drive axially movable de-boost means for modifying the brake pressure in response to signals from skid-sensing means.

A drive device of the aforesaid kind can provide a convenient drive of acceptable efficiency for both de-boosting and re-pressurising a brake actuator. However, the high speed rotation of the armature necessary for these operations and the rapid deceleration thereof from high speed at the end of a de-boost operation, with the de-boost means still subject to some actuator pressure, requires the absorption not only of the armature kinetic energy, but also of the work done by the the de-boost means under the influence of said pressure. If this energy is allowed to be absorbed by the de-energised drive device in a regenerative mode, the regenerative power rating of the device needs to be several times that required for motive power and some components in associated control circuitry need to be disproportionately robust, all of which adds to the cost of the device.

An object of the invention is to provide a rotary electric drive device in which simple provision is made for absorption of some of the excess energy arising during the de-energised state of the device.

According to the invention, a rotary electric drive device comprises a rotary armature, means supporting the armature for rotation relative to fixed structure, and restraint means permitting free rotation of the armature in one direction, but acting to cause resistance to reverse rotation of the armature, at least during a period within which the device is de-energised.

In one convenient arrangement, said restraint means acts to lock said armature support means against reverse rotation, said support means conveniently providing a surface frictionally engaged by a surface associated with the armature in order to provide said resistance to reverse rotation of the armature during locking of said support means.

Conveniently, the support means forms part of a low friction race assembly having a pair of races, one of which is fixed and the other of which supports the armature for rotation relative to the fixed race by way of interposed rolling members. The rotatable race preferably forms part of said restraint means which includes a pawl acting to lock the rotatable race against rotation at least during said part of the de-energised period. Advantageously, the armature is permitted a predetermined amount of free reverse movement, prior to the commencement of restraining action by said restraint means.

Typically, the rotary armature and a member driven thereby are relatively supported telescopically by way of a screw thread mechanism, such that rotation of the armature causes corresponding axial movement of said member.

Preferably, the thread mechanism incorporates a ball race between thread formations associated respectively with the armature and driven member. Conveniently, the armature surrounds and is supported on the driven member.

When the drive device is intended for use in an anti-skid braking system, the driven member is conveniently a piston movable linearly by rotation of the armature to vary the volume of a chamber during an anti-skid braking phase, the chamber being connected, in use, to a brake actuator for modifying the braking pressure thereof in response to signals from skid-sensing means.

The invention will now be described, by way of example, with reference to the accompanying drawings in which.

Figure 1:
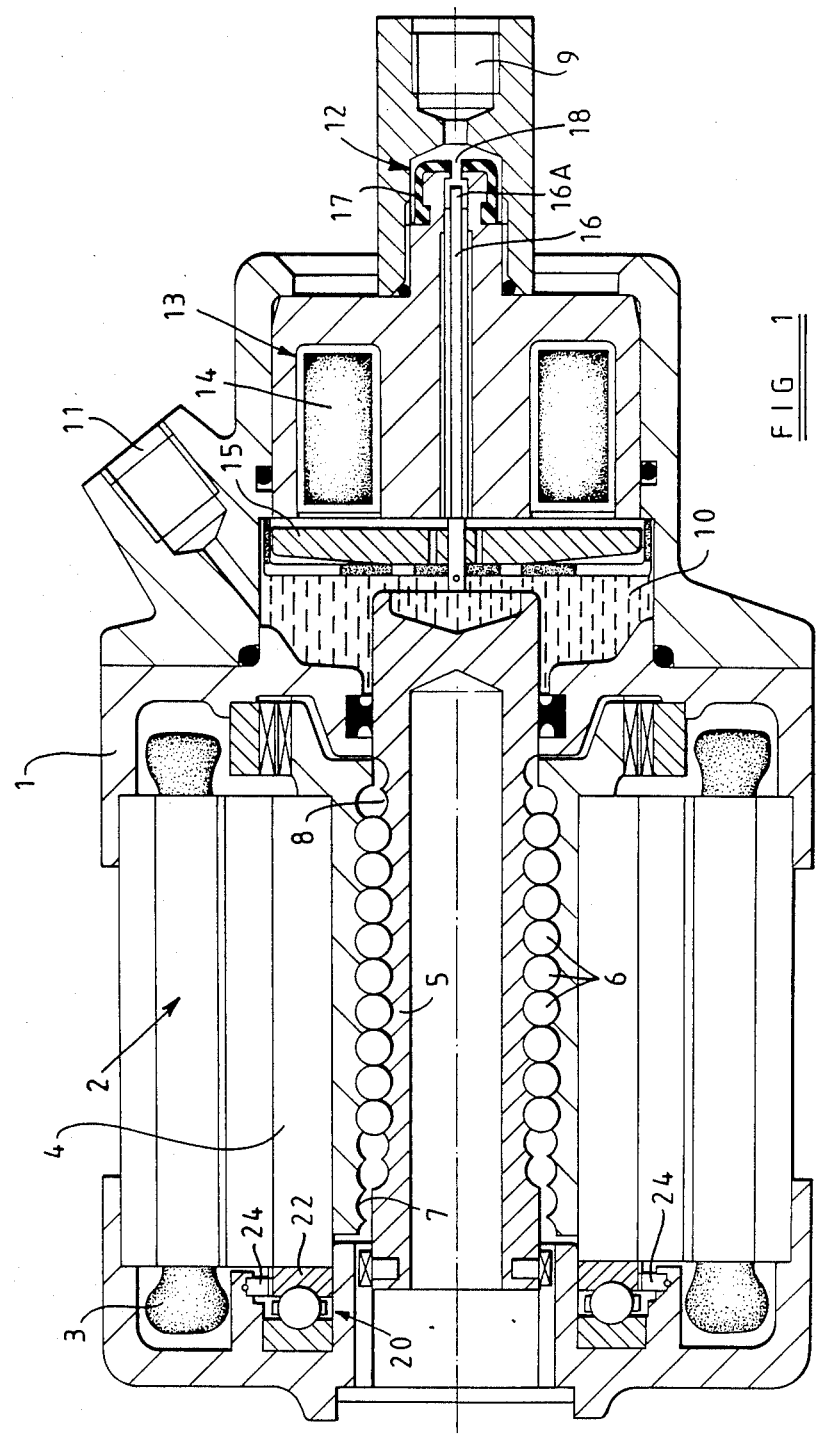
FIG. 1 is a longitudinal cross-section of a combined valve and de-booster device for use in a vehicle anti-skid hydraulic braking system and incorporating one embodiment of the drive device of the invention.

Referring to FIG. 1, this illustrates a combined valve and de-booster device having a casing 1, of which a lefthand portion as seen in the drawing houses an electrical drive device 2 of the invention having a coil 3 and a rotary armature 4, the latter surrounding and being mounted on a de-boost piston 5 by way of an array of balls 6 contained within opposed helical groove formations 7 and 8 formed respectively in the armature and piston. Rotation of the armature in one direction or the other produces corresponding axial movement of the piston 5.

The right hand portion of the housing 1 is provided with a pressure inlet 9 and partially defines a de-boost chamber 10 having a fluid outlet 11 for connection of the de-booster device, in use, to a brake actuator, communication between the fluid inlet and outlet being controlled by a valve device 12 actuated by an electrical solenoid 13. The solenoid 13 includes a coil 14 which co-acts with a disc-shaped armature 15 to which is attached a valve stem 16 extending through the solenoid 13 and arranged to co-act with a resilient cut-shaped valve element 17. The valve element 17 has an orifice 18 therethrough, the valve being closed by an end portion 16A of the stem 16 sealingly engaging within the orifice 18 when actuated by the solenoid 13.

With the stem 16 in its position as illustrated, i.e. removed from the orifice 18, fluid entering the inlet 9 from a pressure source, such as a master cylinder, flows through the orifice 18 and along the outside of the stem 16 into the de-boost chamber 10 and thence to the brake actuator via the fluid outlet 11. When a skid condition is sensed, the solenoid 13 is actuated to move the stem 16 to the right and close off the orifice 18. Simultaneously, or shortly thereafter, the rotor 4 of the motor is rotated in a direction such as to move the de-boost piston 5 to the left in order to expand the de-boost chamber 10 and thereby reduce the pressure in the brake actuator. When the skid condition ceases, the armature is rotated in the opposite direction so as rapidly to restore the pressure in the brake actuator. The valve device 4 is then re-opened to connect the master cylinder to the brake.

During the de-boost cycle, the piston 5 undergoes an initial movement to the left under the driving influence of the motor 2, producing rapid de-boosting of the brake actuator. When the motor is de-energised, the rotor 4 continues to rotate, partly due to its own kinetic energy and partly as a result of the actuator pressure acting on the end of the piston 5. It is desirable to stop the rotor and piston readily after de-energisation of the motor and, in order to avoid too great a reliance upon the regenerative action of the motor, mechanical means are provided to dissipate some of the energy which would otherwise be absorbed by such regenerative action.

Figure 2:
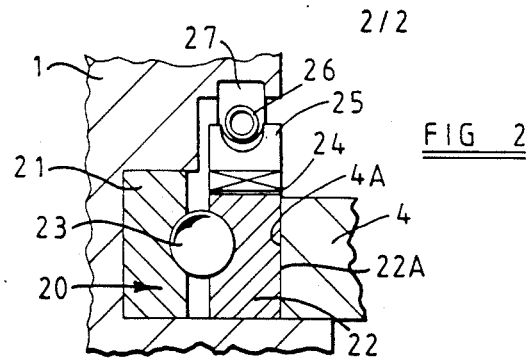
FIG. 2 is an enlarged detail of part of the device of FIG. 1.

In the present embodiment, the mechanical means is incorporated into a thrust bearing 20 located at the left hand end of the armature 4 and illustrated in more detail in FIG. 2. The thrust bearing 20 includes a first stationary race 21 secured to the housing 1 and a second race 22 rotatably mounted on the first race by way of rolling members such as balls 23. An end 4A of the rotor 4 is in frictional engagement with an opposed end 22A of the race 22. The race 22 is provided with ratchet teeth 24 which are engaged by corresponding teeth on a pawl 25 under the action of a coil spring 26. As will be seen more clearly from FIGS. 3 and 4, the pawl is in the form of a part-cylindrical element which is housed within a circumferentially extending recess 27 of the body 1, through which also extends the spring 26 which is housed within an elongate slot 28 of the body.

Figure 3:
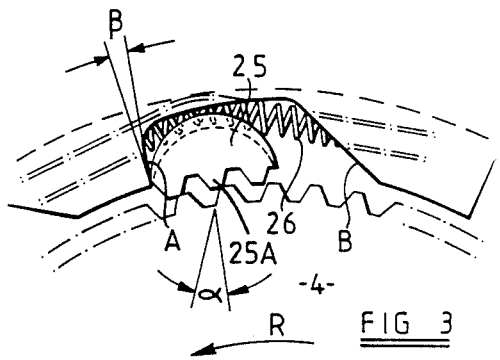
FIG. 3 is a view taken at right angles to that of FIG. 2 illustrating a first operative condition.
Figure 4:
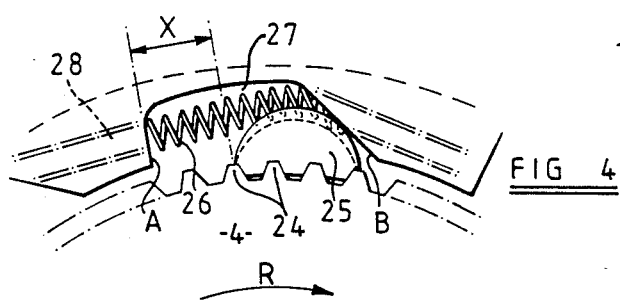
FIG. 4 is a view similar to FIG. 4 illustrating a second operative condition.

FIG. 3 illustrates the assembly in a first operative condition in which the rotor 4 is turning anti-clockwise (as indicated by the arrow R) and the pawl 25 has moved into contact with an end face A of the recess 27. The angle $\alpha$ of inclination to a radial plane of the forward flanks of the teeth 24 for this direction of rotation is chosen so that the pawl 25 is lifted clear of the teeth 24 when the aforesaid abutment with face A takes place. This enables the rotor to rotate freely and rapidly in the brake recovery direction, i.e. to move the piston 5 to the right into the chamber 10 in order to re-pressurise the brakes as rapidly as possible after an anti-skid phase has come to an end. The face A of the recess is inclined, either positively or negatively, at an abutment angle $\beta$ to a radial plane, this angle being chosen in relation to the spring force and the angle $\alpha$ to provide the optimum conditions facilitating disengagement of the pawl when required, and subsequent reliable re-engagement of the pawl, in the manner to be described.

When, with the pawl against the face A, the armature commences rotation in the reverse direction (as indicated by the arrow R in FIG. 4) the pawl must move through a distance X before engaging the relatively inclined opposite end B of the recess 27. This movement through distance X permits a period of free driven rotation of the armature to enable rapid de-boosting of the new brake actuator to take place by movement of the piston 5 to the left. The motor is then de-energised and it is advantageous to stop the armature as quickly as possible, once this has happened. The inclined end B of the recess, together with the spring 26, forces the pawl 25 downwardly into engagement with the teeth 24 and thereby effectively locks the race 22 to the body 1. When this occurs, frictional sliding movement takes place between the end 4A of the armature 4 and the adjacent surface 22A of the race 22, thereby mechanically dissipating some of the kinetic energy of the armature, as well as some of the work done by the actuator pressure present in the chamber 10 acting on the end of the piston 5. By this means, the rotor is brought very rapidly to a halt, with the regenerative effect of the motor minimised by the aforesaid mechanical energy dissipation, so that it is unnecessary to use a motor having a significantly greater power rating than that required to drive the de-boost piston.

It will be understood that any convenient number of uni-directional devices can be distributed around the periphery of the armature and it can be convenient to use a continuous circular garter spring which is engaged at the required intervals by the pawls 24. The pawls may be arranged so that they all become fully engaged at the same time; alternatively, they may be arranged to engage in sequence in order to provide a vernier ratchet effect.

Figure 5:
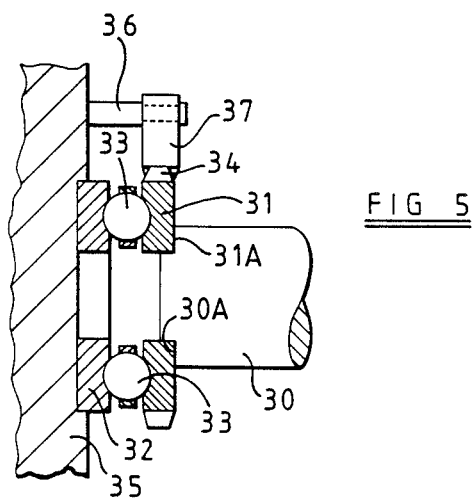
FIG. 5 is a diagrammatic view of part of an alternative embodiment of the drive device of the invention.

In an alternative device, of which a part is illustrated in FIG. 5, a motor shaft 30 is rotatably mounted in a race 31 separated from a fixed race 32 by rolling members 33, usually in the form of balls or rollers. The race 31 has teeth 34 formed on its external periphery, as in the previous embodiment. The fixed rate is mounted on fixed structure 35, upon which is carried a spigot 36 serving as a pivot for a pawl lever 37, the free end of which engages the teeth 34 on the race 31. It will be seen that the motor shaft 30 (or a shaft driven from the motor) is free to rotate in one direction with the pawl riding over the teeth, but that for the reverse direction the pawl engages one of the teeth and thereby locks the race 31 to the structure 35 to prevent further rotation of this race. When this happens slipping occurs between contiguous surfaces 30A and 31A respectively of the shaft and race 31, and with the motor de-energised, some of the kinetic energy of the shaft which would otherwise be absorbed by the regenerative action of the de-energised motor is dissipated at the slipping surfaces.

We claim:

1. A rotary electric device normally rotatable in two opposed directions comprising a rotary armature support means supporting the armature for rotation relative to fixed structure, and restraint means permitting free rotation of the armature in one direction of rotation, wherein said restraint means acts to cause resistance to reverse rotation, at least during a period within which the device is de-energised,
wherein said restraint means acts to lock said armature support means against reverse rotation, said support means providing a surface frictionally engaged by a surface associated with the armature in order to provide said resistance to reverse rotation of the armature during locking of said support means.

2. A device according to claim 1 wherein a part of said support means is provided with teeth which co-act with a pawl to lock said part against rotation at least during said de-energised period.

3. A device according to claim 2 wherein the pawl is urged towards an operative locking position and is provided with teeth complementary with the teeth of said part of said support means and meshing with the latter to lock said part of the support means against rotation, flanks of the teeth being inclined so that when the pawl is urged against an abutment surface by rotation of the armature in its normal direction of rotation, the teeth of the ratchet ride along the inclined flanks of the teeth of the support means to disengage from the latter and unlock the armature for rotation.

4. A device according to claim 3, wherein the armature and a member driven thereby are relatively supported telescopically by way of a screw thread mechanism such that rotation of the armature causes corresponding axial movement of said member.

5. A device according to claim 2 wherein said pawl is urged by contact with a fixed inclined surface into engagement with said teeth of said support means during reverse rotation of the armature.

6. A device according to claim 5, wherein said pawl is urged by contact with a fixed inclined surface into engagement with said teeth of said support means, the pawl being located within a recess of a fixed part, one circumferentially facing surface of the recess being said abutment surface and an opposed surface of the recess forming said inclined surface.

7. A device according to claim 6, wherein the spacing between the opposed surfaces is chosen so as to permit the pawl a predetermined amount of movement before its engagement with said fixed inclined surface, thereby permitting the armature a degree of free reverse movement prior to the commencement of restraining action by the restraint means.

8. A device according to claim 7, wherein the armature and a member driven thereby are relatively supported telescopically by way of a screw thread mechanism such that rotation of the armature causes corresponding axial movement of said member.

9. A device according to claim 6, wherein the armature and a member driven thereby are relatively supported telescopically by way of a screw thread mechanism such that rotation of the armature causes corresponding axial movement of said member.

10. A device according to claim 5, wherein the armature and a member driven thereby are relatively supported telescopically by way of a screw thread mechanism such that rotation of the armature causes corresponding axial movement of said member.

11. A device according to claim 2, wherein the armature and a member driven thereby are relatively supported telescopically by way of a screw thread mechanism such that rotation of the armature causes corresponding axial movement of said member.

12. A device according to claim 1 wherein the support means includes a pair of races, one of which is fixed and the other of which supports the armature for rotation relative to the race by way of interposed rolling members, said other race being provided with teeth co-acting with a pawl to lock that race against rotation at least during said de-energised period.

13. A device according to claim 12, wherein the pawl is pivoted on a fixed part and engaged with teeth on a relatively rotatable part which supports the armature shaft for rotation relative to said fixed part.

14. A device according to claim 13, wherein the armature and a member driven thereby are relatively supported telescopically by way of a screw thread mechanism such that rotation of the armature causes corresponding axial movement of said member.

15. A device according to claim 12, wherein the armature and a member driven thereby are relatively supported telescopically by way of a screw thread mechanism such that rotation of the armature causes corresponding axial movement of said member.

16. A device according to claim 1 wherein the armature is permitted a predetermined amount of free reverse movement, prior to the commencement of restraining action by the restraint means.

17. A device according to claim 16, wherein the armature and a member driven thereby are relatively supported telescopically by way of a screw thread mechanism such that rotation of the armature causes corresponding axial movement of said member.

18. A device according to claim 1, wherein the armature and a member driven thereby are relatively supported telescopically by way of a screw thread mechanism such that rotation of the armature causes corresponding axial movement of said member.

19. A device according to claim 18 wherein the thread mechanism incorporates a ball race between thread formations associated respectively with the armature and driven member.

20. A device according to claim 18 wherein the driven member is a piston movable linearly by rotation of the armature to vary the volume of a chamber connected, in use, to a brake actuator for modifying the braking pressure thereof in response to signals from anti-skid means.

21. A device according to claim 1, wherein the armature and a member driven thereby are relatively supported telescopically by way of a screw thread mechanism such that rotation of the armature causes corresponding axial movement of said member.

22. A rotary electric device normally rotatable in two opposed directions comprising a rotary armature support means supporting the armature for rotation relative to fixed structure, and restraint means permitting free rotation of the armature in one direction of rotation, wherein said restraint means acts to cause resistance to reverse rotation, at least during a period within which the device is de-energised,
 wherein a part of said support means is provided with teeth which co-act with a pawl to lock said part against rotation at least during said de-energised period.

23. A rotary electric device normally rotatable in two opposed directions comprising a rotary armature support means supporting the armature for rotation relative to fixed structure, and restraint means permitting free rotation of the armature in one direction of rotation, wherein said restraint means acts to cause resistance to reverse rotation, at least during a period within which the device is de-energised,
 wherein the support means includes a pair of races, one of which is fixed and the other of which supports the armature for rotation relative to the race by way of interposed rolling members, said other race being provided with teeth co-acting with a pawl to lock that race against rotation at least during said de-energised period.

24. A rotary electric device normally rotatable in two opposed directions comprising a rotary armature support means supporting the armature for rotation relative to fixed structure, and restraint means permitting free rotation of the armature in one direction of rotation, wherein said restraint means acts to cause resistance to reverse rotation, at least during a period within which the device is de-energised,
 wherein the armature and a member driven thereby are relatively supported telescopically by way of a screw thread mechanism such that rotation of the armature causes corresponding axial movement of said member.

\* \* \* \* \*